United States Patent Office 2,865,350
Patented Dec. 23, 1958

2,865,350

FUEL SYSTEMS FOR VARIABLE STROKE PISTON ENGINES

Arnold E. Biermann, Fairview Park, Ohio

Application July 1, 1955, Serial No. 519,347

2 Claims. (Cl. 123—48)

This invention relates to improvements in fuel control and supply systems for variable stroke piston-type internal combustion engines. The principal object is to provide a simple and accurate means for metering fuel to such an engine.

A further objective of this invention is to provide a fuel control system which may be readily modulated by a number of independent variables to match special requirements of the engine to which it is attached.

In the variable piston-stroke internal combustion engine, power is varied by changing the piston stroke. The intake air throttle, if provided at all, is left substantially open throughout the power range. This type of engine and mode of operation is especially efficient at part load because piston friction and pumping losses are reduced to a minimum. Some variable stroke mechanisms are adapted to engines of very large displacement without a corresponding increase in the bulk of the engine. It thus becomes feasible to provide an automobile engine with as much as three times the normal engine displacement and at the same time achieve efficient operation in the low power range.

Such an engine would have three times the range of air flow of present engines. The carburetor, already forced into multiple throats to meet the flow ranges in present engines, cannot be expected to be adapted to this great increase in airflow range. The desirability of reducing the inlet losses of the variable stroke engine to a minimum dictates large unrestricted manifolds and low intake air velocities. The carburetor is obviously unsuited for this application. Therefore, in the variable stroke internal combustion engine, it becomes necessary to meter fuel as a function of some other variable than engine airflow.

Because air flow in the variable stroke engine with an unrestricted inlet system is mainly a function of the engine stroke length and rotative speed, a unique solution to the metering problem is to drive a variable delivery fuel pumping means from the engine thus making fuel delivery to the engine a direct function of engine speed. Then, by linking the variable delivery control of the fuel pumping means to the engine stroke changing mechanism, fuel delivery per engine cycle increases as the stroke increases. With this arrangement the fuel can be sprayed directly into the intake valve port or, with a cyclic injection type of fuel pump, the fuel can be injected directly into the cylinder during the intake stroke. Thus, the problem of measuring a wide range of air flow is eliminated and the intake manifold velocity may be reduced to as low a value as is desired for minimum pumping losses.

Further objects and advantages of this invention will appear in the following in which.

Figure 1:
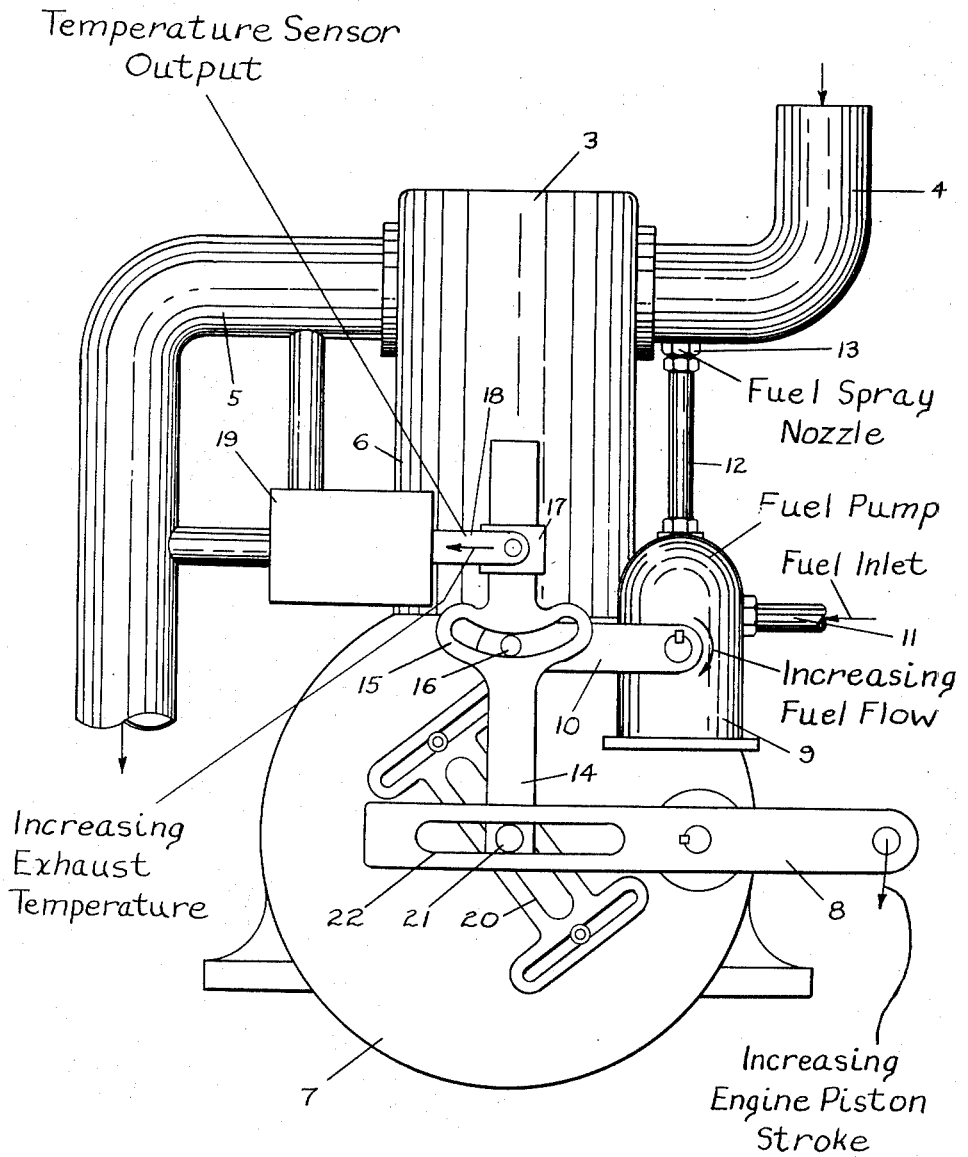
Figure 1 is a schematic view in elevation of the main elements of this invention.
Figure 2:
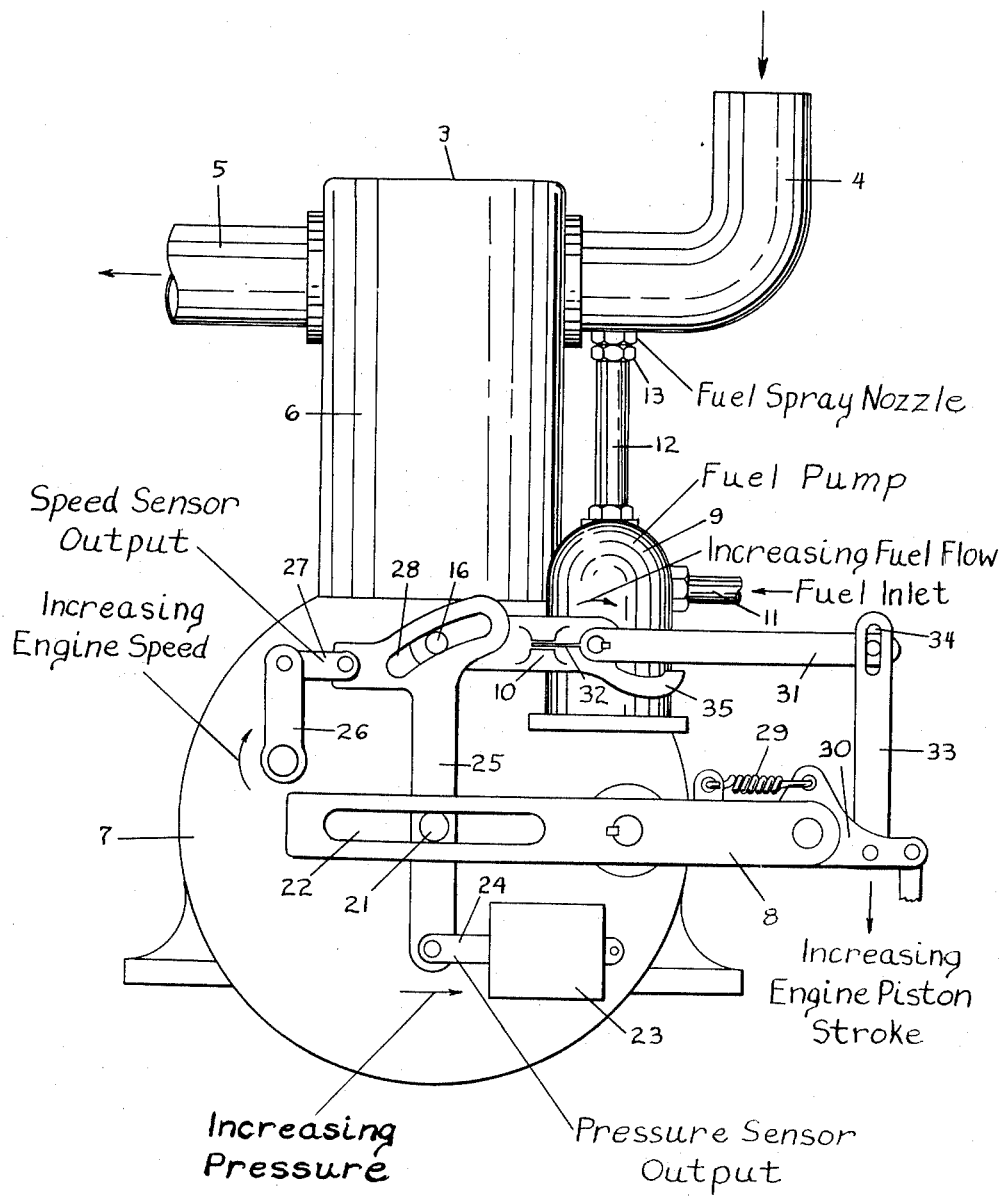
Figure 2 is a schematic view in elevation of an alternate arrangement of the main elements of this invention.

Referring to Figs. 1 and 2, the engine 3 comprises an intake pipe 4, exhaust pipe 5, cylinder 6 and crankcase 7. The stroke changing mechanism of the variable stroke engine is disclosed in my copending application, Serial No. 519,313, filed July 1, 1955, and is operated by lever 8. The variable delivery fuel pump 9 is driven from the engine crankshaft by gears or other suitable means. The fuel flow capacity of the fuel pump per revolution of the pump is controlled or varied by lever 10. The fuel pump may be a piston-type pump with variable stroke or variable cut-off or any suitable variable delivery pump or variable fuel supply system.

Fuel is supplied to the fuel pump through tube 11 and is discharged through tube 12 into fuel nozzle 13 which protrudes into the intake pipe.

In Fig. 1, the stroke-change lever 8 has an elongated slot 22 at one extremity and into this slot one end of pin 21 is inserted. Pin 21 extends through link 14 and engages slot 20. The stroke-change lever 8 is linked to the fuel pump lever 10 through slot 22 and pin 21 to link 14 which is constructed with a slotted cam 15. The slotted cam 15 engages pin 16 at the extremity of the fuel pump control lever 10. A yoke 17 is slidably mounted on link 14 for operation by rod 18 from the temperature sensing element 19. The temperature sensing element 19 in Fig. 1 is arranged to sense exhaust temperature by flowing exhaust gas through the unit. Other temperatures, however, such as ambient air or cylinder wall temperatures may be sensed instead.

The fuel delivery characteristics may be modulated by means of slotted cam 20 in conjunction with pin 21 as the piston stroke is varied. The position of slotted cam 20 is adjustably fixed to achieve a desired variation of flow with stroke. Slotted cam 15 may be shaped to produce the desired characteristics of fuel flow versus temperature. For example, as shown in Fig. 1, the fuel-air mixture would be enriched at low temperatures and at very high exhaust temperatures. A cold engine would require a richer mixture for both starting and running. Likewise, a very hot engine may require a rich mixture to avoid overheating and to avoid fuel knock.

Fig. 2 illustrates how the variable "engine speed" and "atmospheric pressure" may be used to obtain special fuel flow characteristics and how, at full piston stroke, the fuel-air mixture may be enriched to provide further increases in engine power. The pressure sensing element 23 controls the position of link 25 along slot 22 by moving rod 24. The engine speed is sensed by a suitable means such as a centrifugal governor and its value is indicated by the angular position of lever 26 and this position is transmitted to link 25 by means of rod 27. The sensed speed may be impressed upon the fuel delivery characteristics by means of cam 28 in conjunction with pin 16. Thus it is apparent from the diagram of Fig. 2 that the fuel flow versus piston stroke characteristics may be independently modulated to obtain unique characteristics with respect to engine speed and atmospheric or intake pressure.

Figure 3:
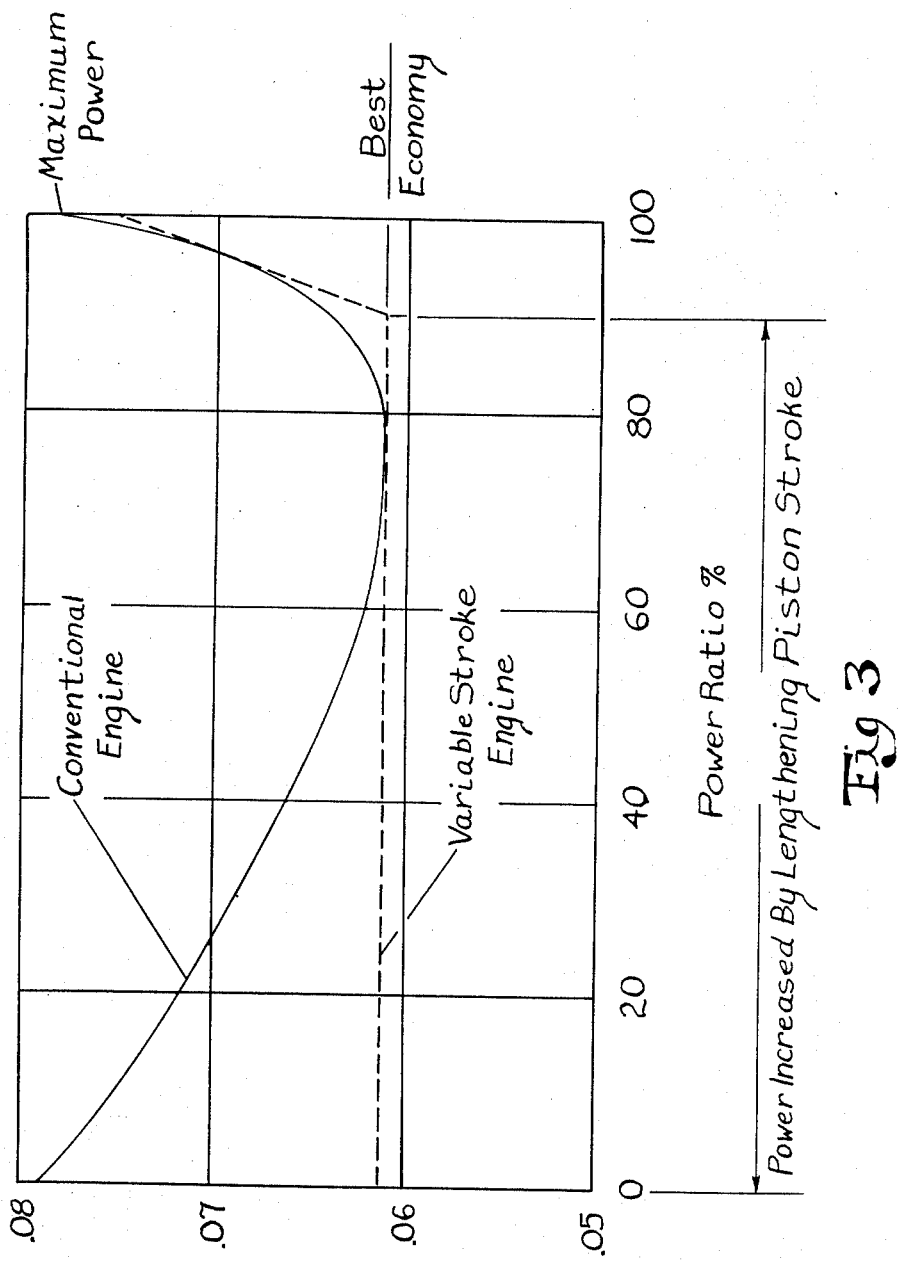
Figure 3 is a diagram for comparing methods of engine control.

The solid line of the diagram in Fig. 3 shows how the fuel-air mixture ratio of the conventional piston engine is generally varied as the throttle is opened (torque increased). The lowest fuel consumption is ordinarily obtained with a fuel-air ratio approximately of 0.062, however, because of practical limitations the mixture must be enriched in both the idling and full throttle ranges as shown. In the idling range the conventional engine must be enriched in order to obtain consistent firing at the low manifold pressures. Poor mixture distribution to the various cylinders is also a factor that makes it necessary to enrich the mixture. In the open throttle range the mixture must be enriched in order to avoid fuel knock and in order to obtain maximum power.

The dashed line of Fig. 3 shows the desired variation of fuel mixture ratio for the variable-stroke piston engine. Because of the high cylinder pressures in such an engine at low outputs and because of the better mixture distribution the mixture need not be enriched in the low and intermediate torque ranges. Finally, if more torque is desired than can be obtained by increasing piston stroke, the mixture of the variable stroke engine can be enriched as shown in Fig. 3. The differences between the curve for the conventional engine and that for the variable stroke engine thus illustrate the potential improvement in fuel consumption by operating in this manner.

The method of enriching the mixture after the full piston stroke position has been reached is illustrated in Fig. 2 in which lever 30 is rotatably pinned to the extremity of stroke change lever 8 and is prevented from rotating under normal operating forces by spring 29 which is anchored at one extremity to the stroke-change lever 8. Lever 30 engages a pin at the extremity of lever 31 through link 33 and slot 34 formed in link 33. The fuel flow capacity of the fuel pump is determined by the angular movement of lever 31. Lever 31 is attached to fuel control lever 10 by leaf spring 32 which forms an extension of lever 31. In normal operation, the fuel delivery is determined by lever 10 which operates lever 31 through spring 32 which is not deflected by the normal operating forces. Lever 31 is not constrained from rotating by link 33 because the pin at the extremity of lever 31 is free to slide in the slot 34 on the end of link 33. At full piston stroke, stroke-change lever 8 is constrained from further rotating by stop means inherent in the stroke change mechanism. Further demand for power by means of a force applied to the end of link 30 will rotate link 30 by stretching spring 29, pulling link 33 down until the pin at the extremity of lever 31 is engaged and rotates lever 31. Lever 31 is free to rotate without disturbing fuel control lever 10 by bending leaf spring 32. The amount lever 31 is permitted to rotate under this condition of operation is determined by stop 35 formed by an extension to fuel control lever 10. The degree of fuel enrichment is thus precisely determined. Thus the fuel flow per engine cycle is increased without disturbing the other control devices in the mechanism, and a further increase in power is obtained from the engine.

Since the foregoing construction of my invention is otherwise capable of considerable modification without in any manner departing from the spirit of the invention, I do not wish to be understood as limiting myself to the specific arrangements herein disclosed except as hereinafter claimed.

I claim:

1. In a control system for a variable-stroke internal combustion engine, a variable delivery fuel pumping means, a control shaft on said fuel pumping means, a driving spring on said control shaft, a stroke change lever on said engine for adjustably varying the piston stroke, a fuel control lever for driving said control shaft through said spring, a link connecting said fuel control lever and said stroke change lever, a direct connected lever on said control shaft, a spring loaded hinged lever mounted on said stroke change lever, a slotted link connecting said direct connected lever and said hinged lever, and linkage connected to said spring loaded hinged lever for varying the position of said stroke change lever from minimum stroke position to maximum stroke position and for increasing fuel flow after maximum stroke position of said stroke change lever is reached.

2. In a fuel supply system for a variable stroke internal combustion engine, a variable delivery fuel pumping means which meters fuel as a function of engine speed and independently as a function of the position of a fuel control lever on said fuel pumping means, a stroke-change lever on said engine for adjustably varying the piston stroke of said engine, linkage means connecting said fuel control lever and said stroke-change lever for varying fuel flow as a function of piston stroke, and means for adjustably varying the rate of movement of said fuel control lever with respect to the rate of movement of said stroke change lever.

References Cited in the file of this patent

UNITED STATES PATENTS

| | | |
|---|---|---|
| 1,909,372 | McCollum et al. | May 16, 1933 |
| 1,983,351 | Edwards | Dec. 4, 1934 |
| 2,401,188 | Prince | May 28, 1946 |
| 2,435,902 | Reggio | Feb. 10, 1948 |
| 2,500,823 | Hickey | Mar. 14, 1950 |
| 2,615,437 | Broderson | Oct. 28, 1952 |
| 2,644,021 | Hittell | June 30, 1953 |
| 2,670,724 | Reggio | Mar. 2, 1954 |